Nov. 24, 1931.  B. A. PETERSON  1,833,495
BALL WARPER
Filed Jan. 21, 1924   8 Sheets-Sheet 1
Fig.1.
Fig.2.
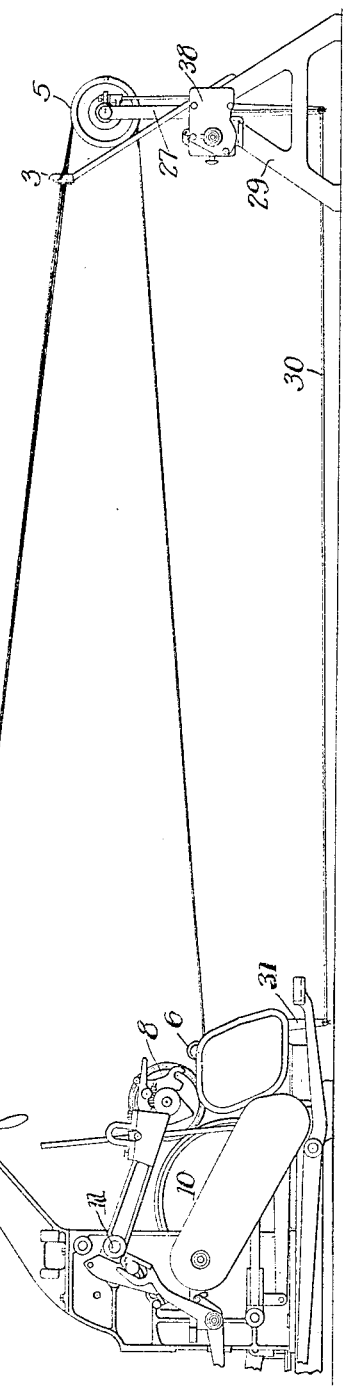
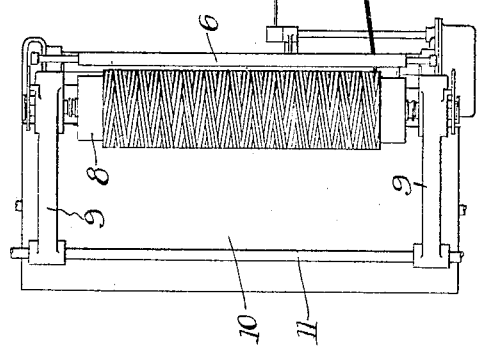
Inventor:
B. A. Peterson
By Chindahl Parker Carlson
Attys.

Nov. 24, 1931.     B. A. PETERSON     1,833,495
BALL WARPER
Filed Jan. 21, 1924     8 Sheets-Sheet 2
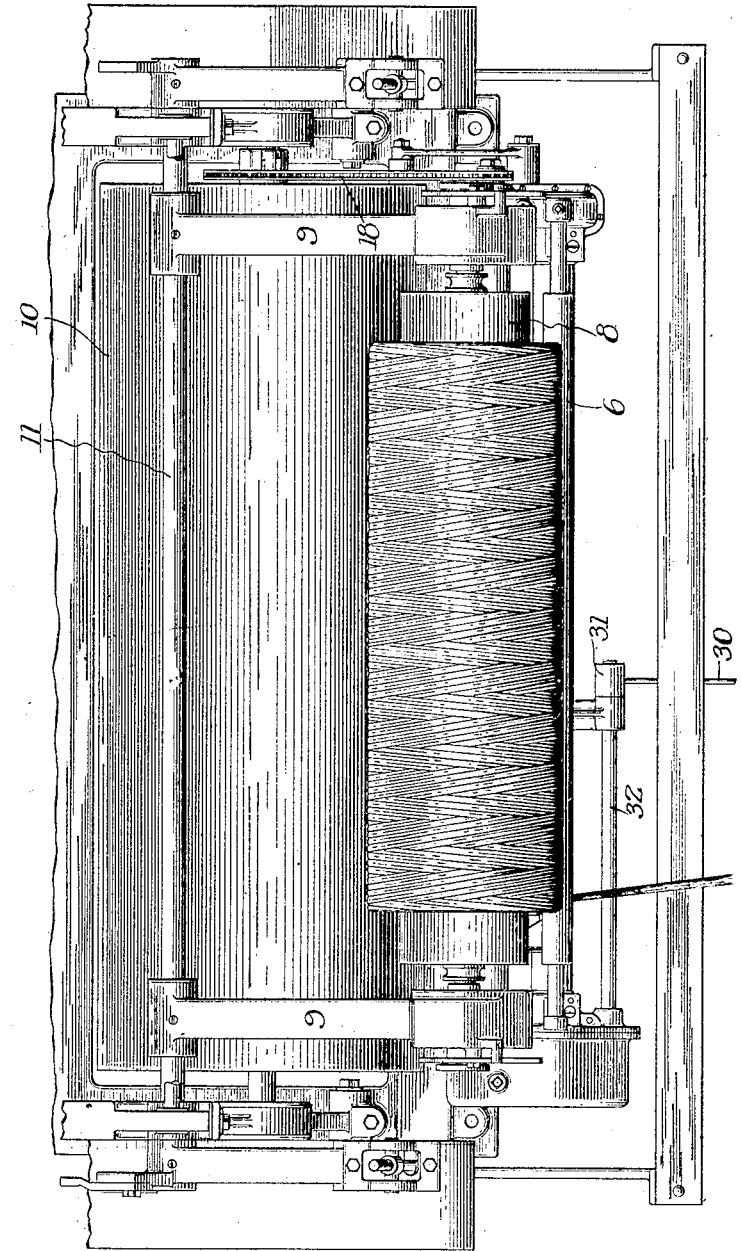
Inventor:
B. A. Peterson
By Chindahl Parker Carlson
Attys.

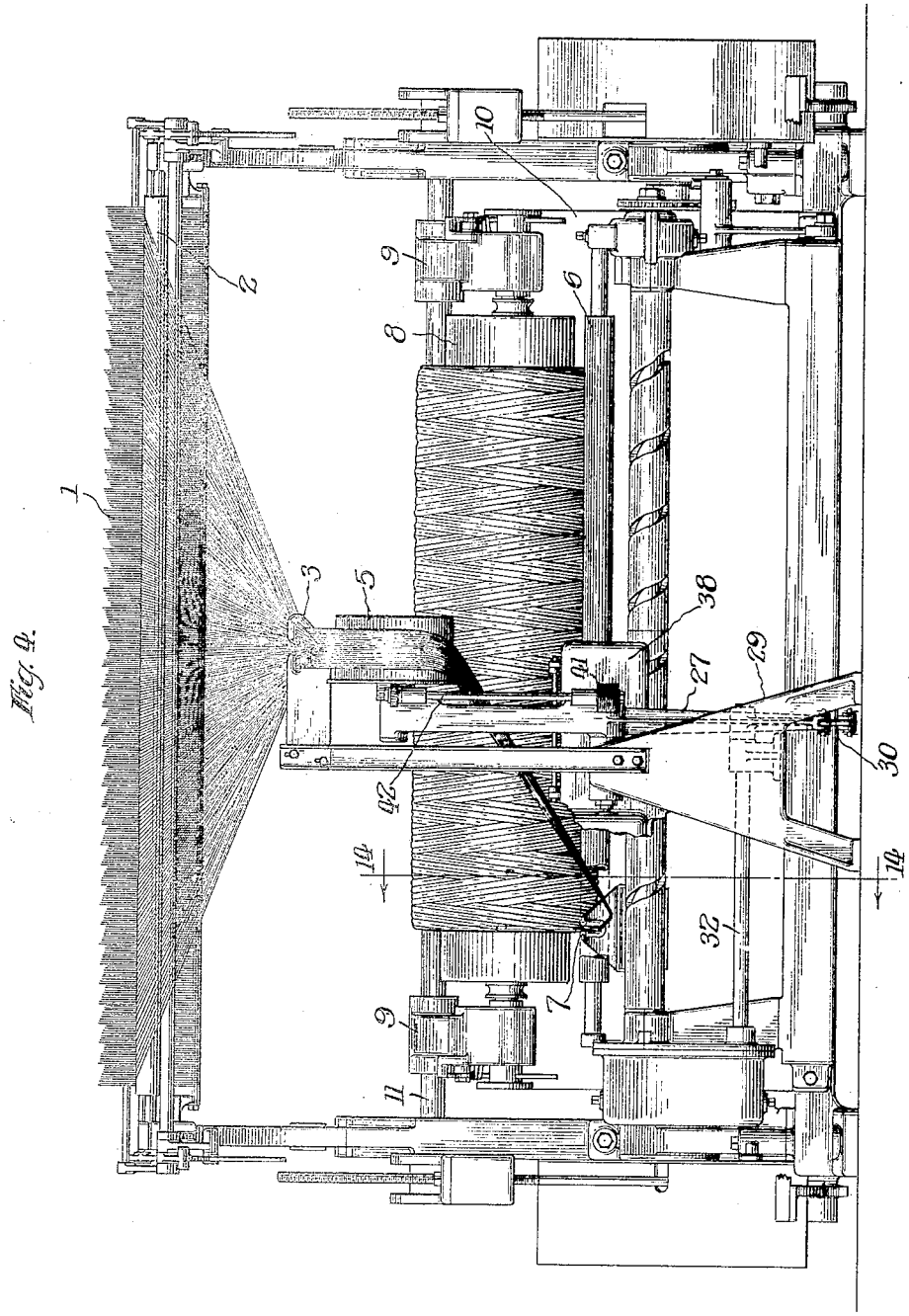

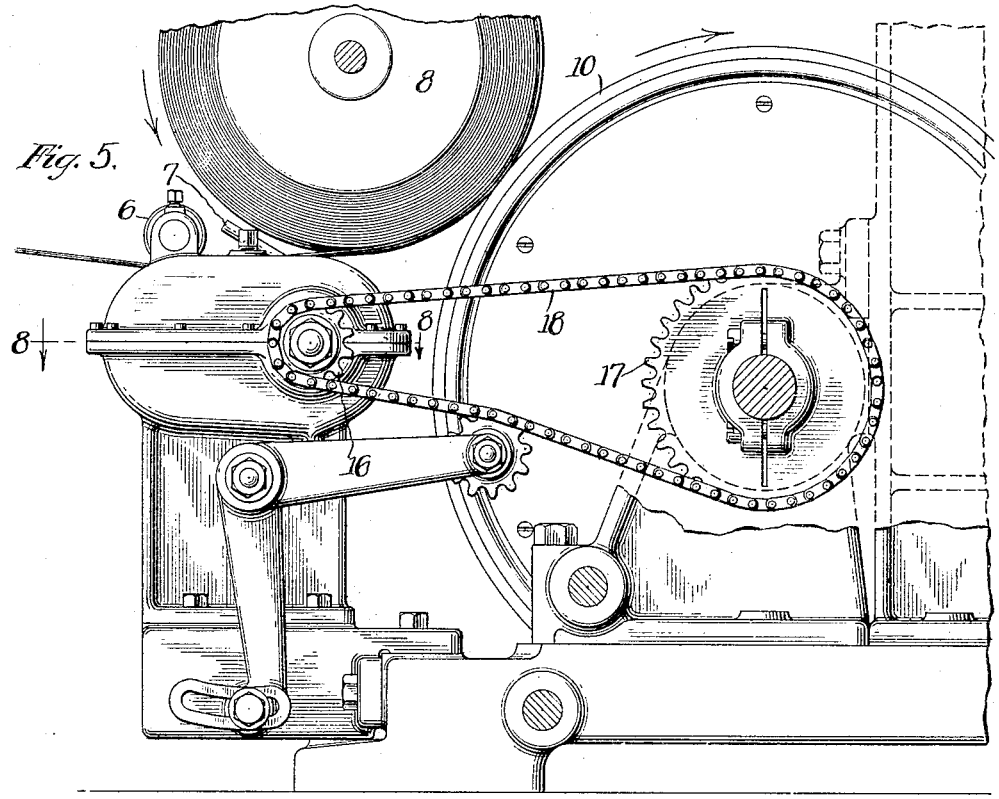
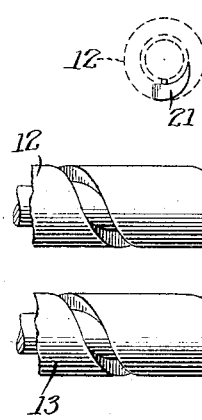
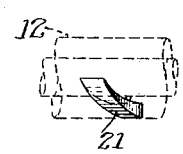
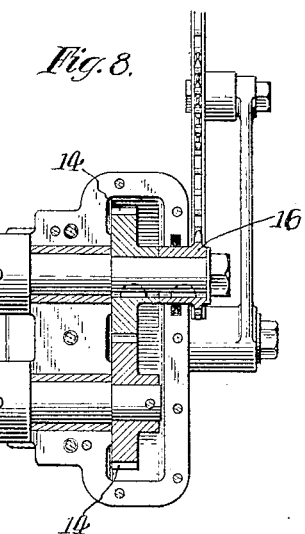

Nov. 24, 1931.  B. A. PETERSON  1,833,495
BALL WARPER
Filed Jan. 21, 1924    8 Sheets-Sheet 5
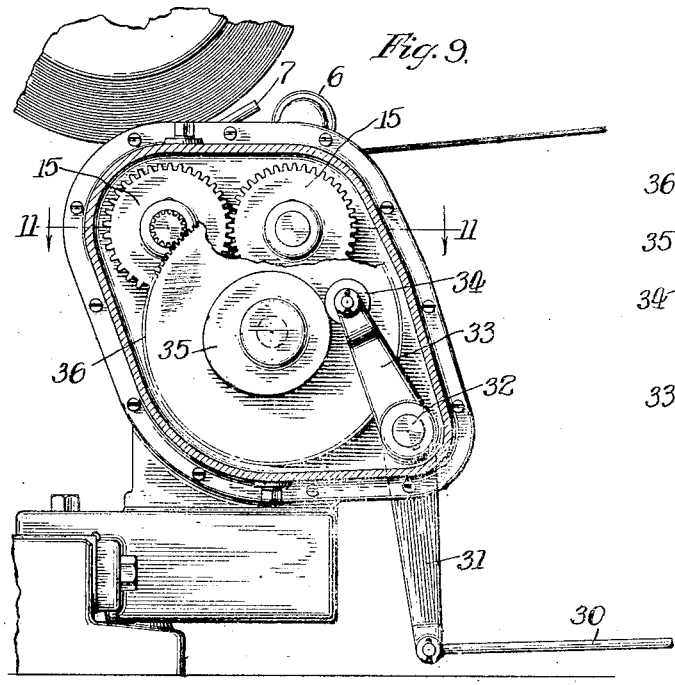
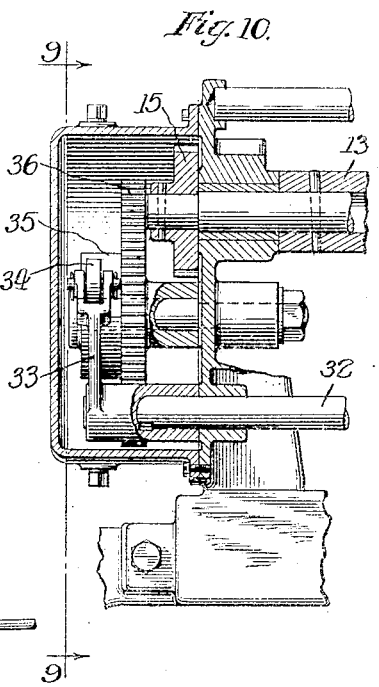
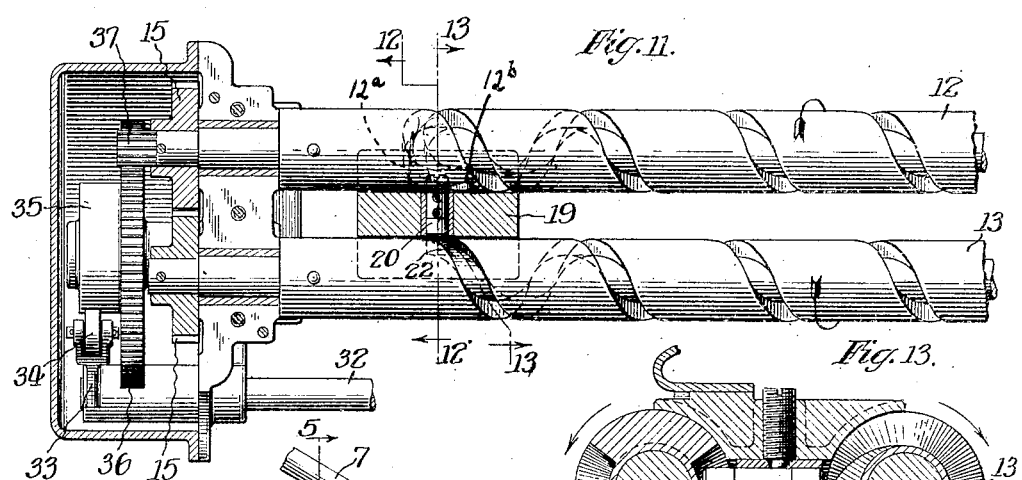
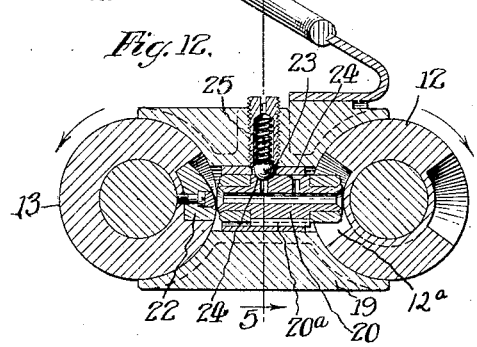
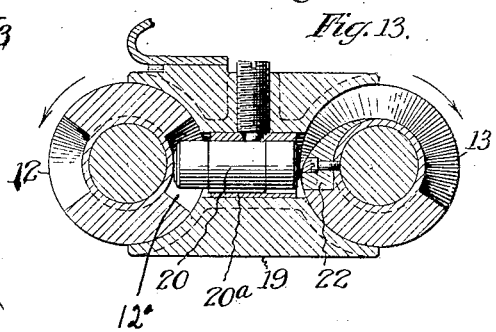
Inventor:
B. A. Peterson

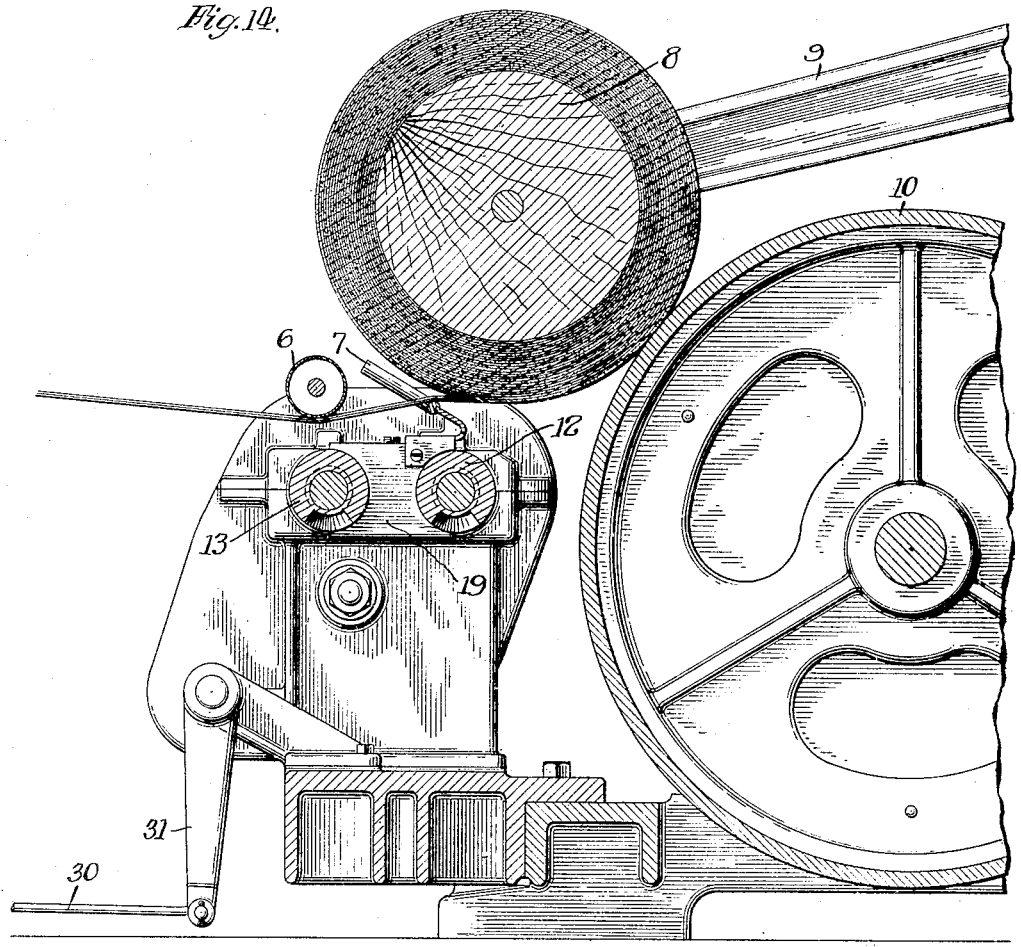

Nov. 24, 1931.　　　　B. A. PETERSON　　　　1,833,495
BALL WARPER
Filed Jan. 21, 1924　　　8 Sheets-Sheet 7

Inventor:
B. A. Peterson

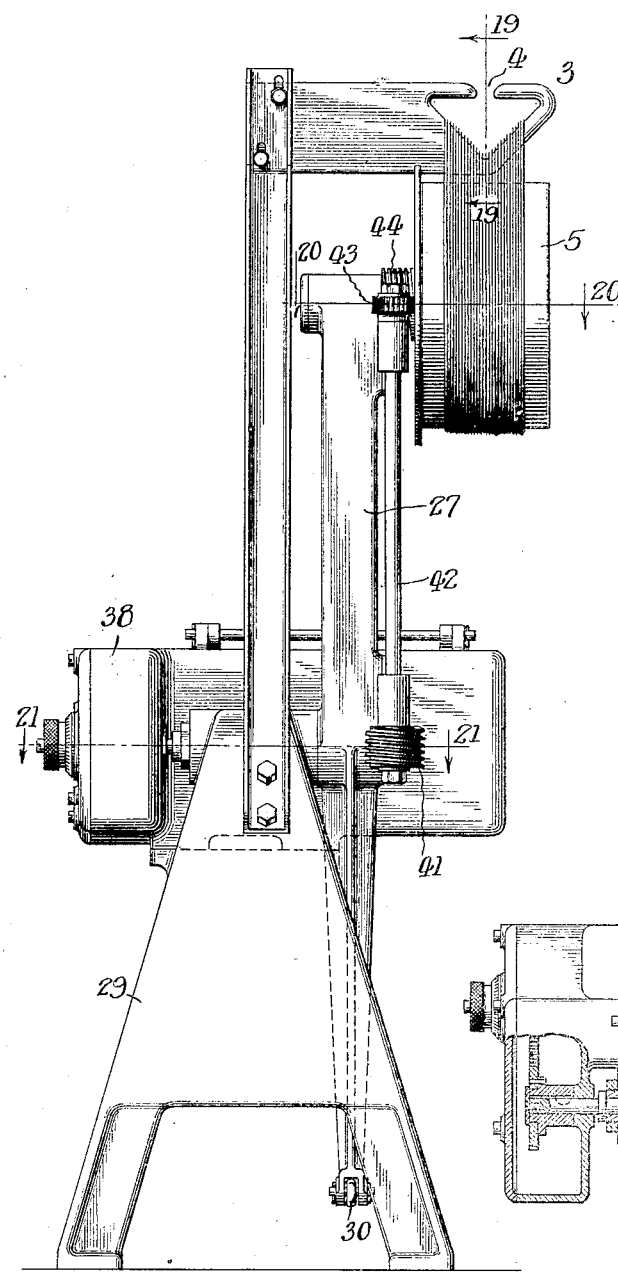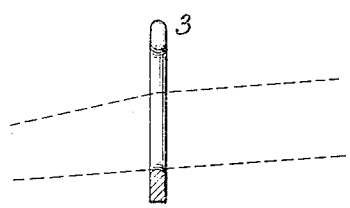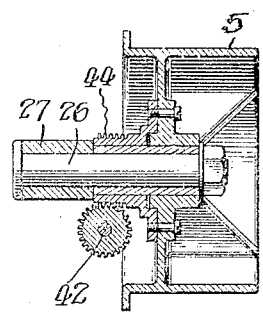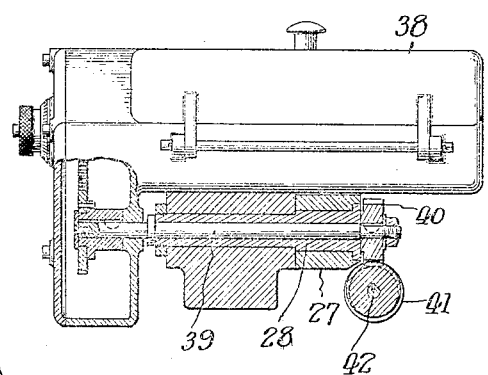

Patented Nov. 24, 1931

1,833,495

UNITED STATES PATENT OFFICE

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS

BALL WARPER

Application filed January 21, 1924. Serial No. 687,419.

In passing from the leasing comb to the traversing guide that lays the threads upon the beam, the threads pass around a guide pulley located at some distance from the warper. In ball warpers of the prior art, as the guide is traversed from the middle of the beam to the end thereof, the length of the yarn between the traversing guide and said pulley increases, thus accelerating the supply yarn masses. When the guide is traversed from the end of the beam to the middle thereof, the length of yarn between the guide and the pulley decreases, and the supply yarn masses, if mounted for free rotation, will overrun and produce sufficient slack to cause the detectors to fall and thus stop the warper. One of the objects of the present invention is to provide means to prevent such acceleration and overrunning of the supply yarn masses.

The invention also relates to the various other improvements pointed out in connection with the ensuing description of the machine.

Figure 15:
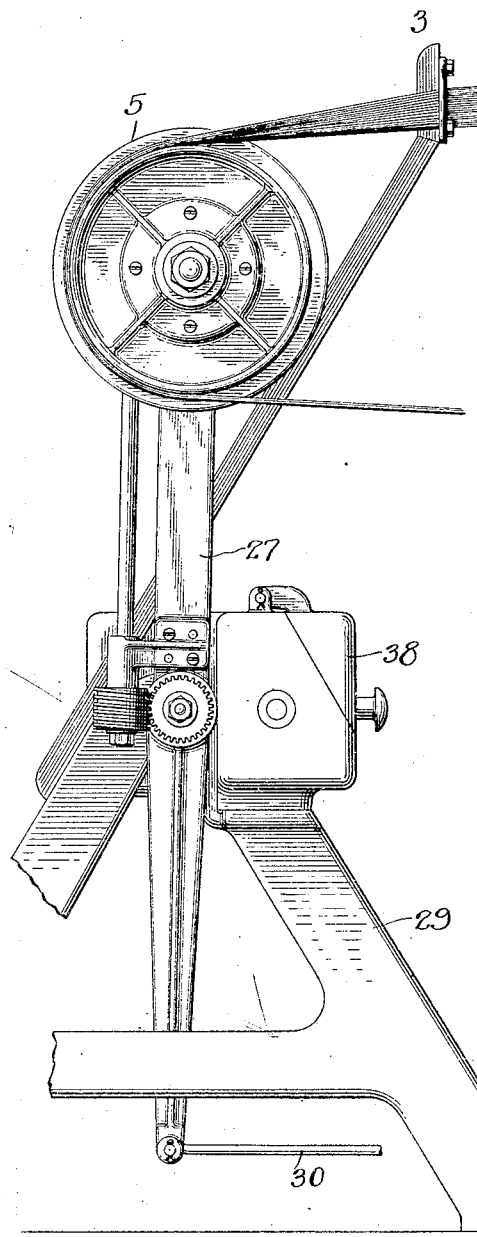
Figure 16:
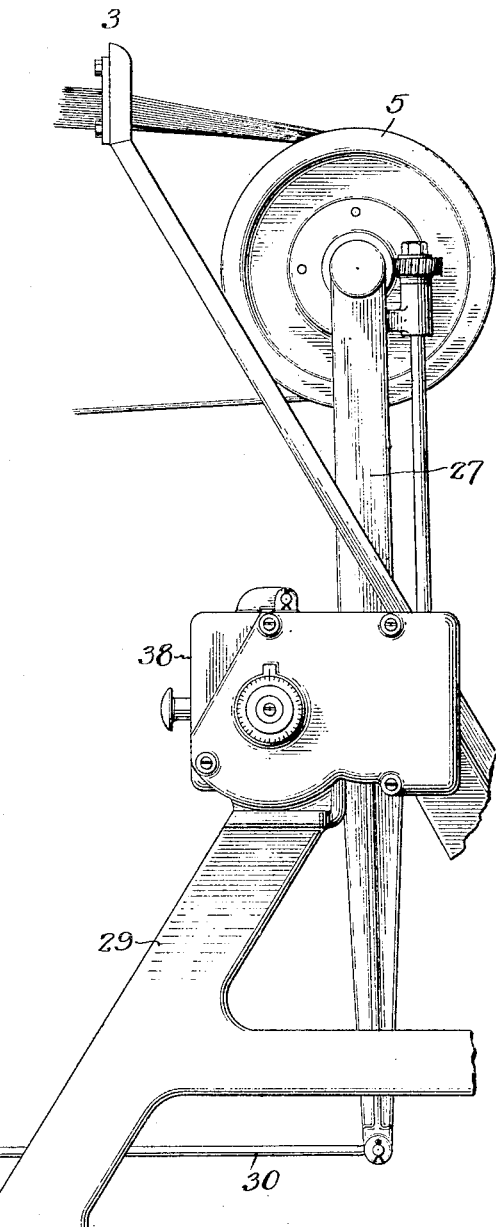

In the accompanying drawings, Figure 1 is a plan view, with parts omitted, of a ball warper embodying the features of my invention. Fig. 2 is a fragmental side elevation of the warper. Fig. 3 is a fragmental plan view of the warper. Fig. 4 is a front view of the warper. Fig. 5 is a fragmental right-hand end view of the warper. Figs. 6, 7 and 8 illustrate the means for traversing the yarn guide. Fig. 9 is a fragmental view looking from the left-hand end of the warper, the view being taken in the plane of line 9—9 of Fig. 10. Fig. 10 is an irregular sectional view of some of the parts shown in Fig. 9. Fig. 11 is a view taken in the plane of line 11—11 of Fig. 9. Figs. 12 and 13 are views taken in the planes indicated by lines 12—12 and 13—13, respectively, in Fig. 11. Fig. 14 is a view taken in the plane of line 14—14 of Fig. 4. Figs. 15 and 16 are views from opposite sides of the mechanism for reciprocating the yarn guide pulley. Fig. 17 is a front view of said mechanism. Fig. 18 is a view taken in the plane of line 18—18 of Fig. 17. Fig. 19 is a section on line 19—19 of Fig. 17. Fig. 20 is a view of the warper clock with the driving connections shown in section in the plane of line 20—20 of Fig. 17.

The warper is especially, although not exclusively, adapted for use with a creel of the type disclosed in application Serial No. 190,501, filed September 10, 1917, by Howard D. Colman, (now Patent No. 1,544,055, dated June 30, 1925). The Colman creel is especially designed to support cheeses A, the cheeses being mounted on anti-friction bearings so as to revolve very freely. The threads extending from the cheeses pass through suitable guiding and spacing means on the warper, which means may, if desired, comprise a leasing comb 1. From the leasing comb the threads extend over a guide roll 2 and thence to a stationary guide 3 (Figs. 4 and 17). The guide 3 has an opening 4 through which the threads may be initially introduced into the guide. The bottom of the guide is V-shaped or angular in form. The sheet of threads extending through the leasing comb 1 is contracted in passing through the guide 3 to form a flat, smooth, compact "chain", all the threads of which are under the same tension. From the guide 3 the chain passes around a guide pulley 5 and thence under a guide roll 6 and through a traverse guide 7 which condenses the chain and lays it upon the beam 8 as the latter is revolved.

The beam 8 may be of any ordinary or preferred form and may be supported and rotated in any desired manner. Herein the trunnions of the beam are shown as connected to two arms 9 which support the beam upon a friction driving drum 10. The arms 9 are fixed upon a rock shaft 11. If desired, means may be provided to keep the beam pressed against the driving drum 10, which means may be of any suitable character, as, for example, that shown in the Colman Patent No. 1,366,447, dated January 25, 1921.

While the means for traversing the guide 7 may be of any desired construction, I prefer to employ two parallel constantly-driven screws rotating in opposite directions. These screws are designated 12 and 13 in the drawings (see particularly Fig. 8). The screws are connected for simultaneous rotation by means of spur gears 14 and 15 (Figs. 8 and 11). To the shaft of the screw 12 is fixed a sprocket wheel 16 (Figs. 5 and 8) which is driven from a sprocket wheel 17 through a driving chain 18. The sprocket wheel 17 is fixed to the shaft of the friction driving drum 10.

A yarn guide carriage 19 (Fig. 12) is mounted between and supported by the screws 12 and 13, the front and rear sides of said carriage being made concave to receive and rest upon said screws. The traverse guide 7 is rigidly secured to the carriage 19. A plunger 20 is located centrally of the carriage 19 to slide back and forth into and out of engagement with the respective screws. The plunger 20 carries a spline 20$^a$ which prevents turning of the plunger. In the right-hand end of the spiral groove of the screw 12 is secured a cam 21 (Figs. 6, 7 and 8) which virtually forms the bottom of the groove at that point, and which causes the depth of the groove to diminish to zero. The opposite end of the groove is reversely curved as indicated at 12$^a$ in Fig. 11, the extreme end of the groove being shown at 12$^b$. In the left-hand end of the spiral groove of the screw 13 is a cam 22 (Figs. 11, 12 and 13) similar to the cam 21. The right-hand end of the groove in the screw 13 is reversely curved as shown at 13$^a$ (Fig. 7), the extreme end of the groove being indicated at 13$^b$.

When the carriage 19 approaches the right-hand end of the screws 12 and 13, the cam 21 will push the plunger 20 out of the spiral groove in the screw 12 and into the reversely curved portion 13$^a$ of the spiral groove in the screw 13. Said reversely curved portion continues to move the carriage 19 toward the right with undiminished speed until the plunger 20 reaches the end of the screw 13, whereupon the carriage 19 will begin travelling toward the left. Upon nearing the left-hand end of the screws 12 and 13 the cam 22 will force the plunger 20 out of the spiral groove in the screw 13 and into the reversely curved portion 12$^a$ of the spiral groove in the screw 12, thus causing prompt reversal of the direction of travel of the carriage 19 after the plunger 20 has reached the end of the screw 12. In order yieldingly to hold the plunger 20 in the position to which it is moved by the cams 21 and 22, there is provided a detent comprising, in this instance, a ball 23 (Fig. 12) arranged to engage in either of two recesses 24 formed in the plunger 20, said ball being yieldingly pressed into engagement with the plunger by a coiled expansive spring 25.

To prevent acceleration of the cheeses as the traversing guide moves away from the mid-point of its traverse and consequent over-running of the cheeses as the traversing guide 7 moves toward such mid-point, or in other words to keep the yarn tension and the yarn velocity constant, I provide means for adjusting the position of the pulley 5 as the traverse guide is reciprocated. Upon reference to Figs. 17 and 18, it will be seen that the shaft 26 of the pulley 5 is carried at the upper end of a lever 27. Said lever is mounted between its ends upon a pivot 28 (Fig. 20) which is secured in the frame 29 that supports the guide 3. To the lower end of the lever 27 is pivoted a rod or link 30 which extends to an arm 31 (Figs. 3 and 9). The arm 31 is fixed upon one end of a rock shaft 32. To the other end of the shaft 32 is fixed an arm 33 carrying a roller 34 which bears upon a cam 35. The roller 34 is held against the cam 35 by the tension of the threads exerted through the pulley 5, the lever 27, the link 30, the arm 31, the shaft 32 and the arm 33. The cam 35 is rigid with a spur gear wheel 36. The latter meshes with a pinion 37 which is rigid with the shaft of the screw 12. It will be seen that as the screws 12 and 13 rotate, the cam 35 will be rotated and cause the pulley 5 to move toward the receiving yarn mass as the traversing guide 7 moves away from the mid-point of its traverse, the pulley moving away from the receiving yarn mass as the traversing guide moves toward said mid-point, the cam being of such form and so timed that the length of the threads between the comb 1 and the traverse guide 7 will be maintained constant.

Regardless of where the individual threads come from, they are concentrated at the stationary guide 3 into a chain which then becomes virtually a unitary rope extending from the stationary guide 3 to the traversing guide 7.

In order that the warper may be stopped for the insertion of a lease at predetermined intervals in the length of the chain, I provide a warper clock 38 mounted upon the framework 29 and driven by means including a shaft 39 (Fig. 20) extending axially of the pivot 28. On one end of the shaft 39 is fixed a spiral gear 40 which meshes with a spiral gear 41 secured to the lower end of a shaft 42 which is journalled on the lever 27. To the upper end of the shaft 42 is secured a spiral gear 43 that meshes with a spiral gear 44 formed on the hub of the pulley 5.

As shown in Fig. 15, there is a large arc of contact between the chain and the pulley 5, thus preventing slippage between the chain and the pulley and insuring accurate operation of the warper clock.

I claim as my invention:

1. A ball warper having, in combination, yarn traversing means comprising two parallel screws arranged to be driven in opposite directions, one end of the groove of one screw being reversely curved, and the opposite end of the groove of the other screw being likewise reversely curved, a carriage supported by and between said screws, a plunger in the carriage arranged to engage said screws, one of said screws having at one end a cam arranged to move said plunger completely out of engagement with said screw and into engagement with the reversely curved portion of the other screw, and said other screw having at the opposite end a cam arranged to shift the plunger completely out of engagement with said other screw and into engagement with the reversely curved portion of the first-mentioned screw, and a yarn guide on said carriage.

2. A ball warper having, in combination, means for rotatably supporting supply yarn masses, means for rotating a receiving yarn mass to rewind yarn from the supply yarn masses onto the receiving yarn mass, a stationary yarn guide to collect the yarn into a chain, a traversing yarn guide to lay the chain on the receiving yarn mass, a guide pulley over which the chain passes intermediate said stationary guide and the traversing guide, and means to prevent over-running of the supply yarn masses comprising means operating in timed relation to the means for moving the traversing guide, for moving said guide pulley toward the receiving yarn mass as the traversing guide moves away from the mid-point of its traverse and for moving said guide pulley away from the receiving yarn mass as the traversing guide moves toward said mid-point.

3. A winder having, in combination, means for rotatably supporting a supply yarn mass, means for rotating a receiving yarn mass to rewind yarn from the supply mass onto the receiving mass, a traversing yarn guide to lay the yarn on the receiving mass, a yarn guide intermediate the supply mass and the traversing guide, and means to prevent acceleration and over-running of the supply mass as the traversing guide moves toward and away from the mid-point of its traverse, said preventing means being driven in timed relation to the movement of the traversing guide.

In testimony whereof, I have hereunto affixed my signature.

BURT A. PETERSON.